United States Patent Office 2,982,118
Patented May 2, 1961

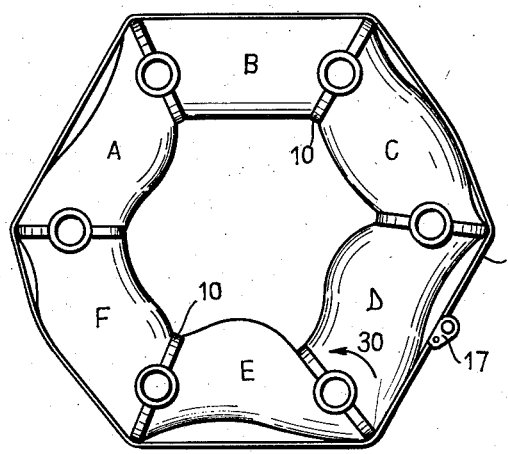
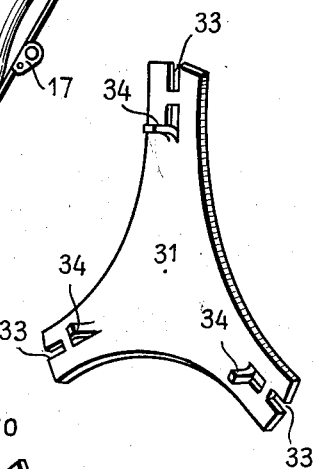
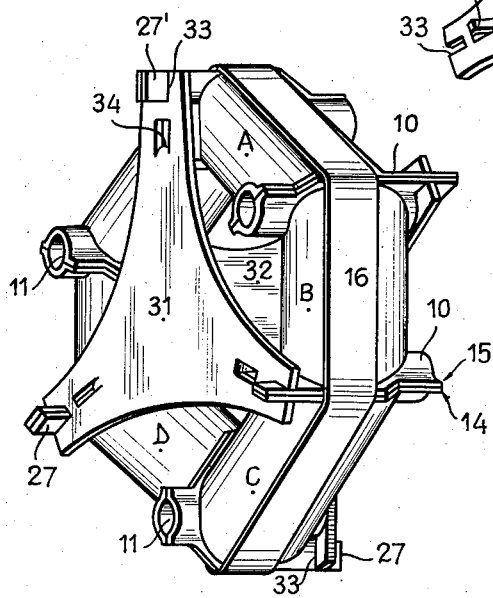

2,982,118
RESILIENT TRANSMISSION JOINTS FOR SHAFTS

Alessandro Franceschetti and Giuseppe Gilardi, Milan, Italy, assignors to Società Applicazioni Gomma Antivibranti S.A.G.A., S.p.A., Milan, Italy Filed June 15, 1960, Ser. No. 36,388

Claims priority, application Italy July 18, 1959

7 Claims. (Cl. 64—13)

The present invention refers to resilient joints for transmission of torque, of the type wherein the resilient annulus jointing the two spiders includes a polygonal series of rubber blocks having each a central rectilinear axis and a rigid ferrule connecting each pair of adjacent blocks, said ferrule having a bolt hole formed therein in which a respective spider bolt is tightened. For the purposes of flexibility of the resilient annulus it would be advantageous to employ rubber blocks as long as possible, that is blocks having an average length which is at least equal to the radial thickness of the block.

On the other side, in order to ensure favourable working conditions for the rubber blocks it would be desirable to precompress each block in the direction of its length, i.e. in the direction of the straight line segment connecting two subsequent bolt holes in the annulus. It has been ascertained, however, that by introducing such features, the single blocks are brought to a condition the more unstable the greater is their length and the higher is their degree of precompression. This unstability involves irregular operation of the blocks in the joint and makes difficult the application of the annulus upon the respective spiders on assembly of the joint. It is therefore an object of this invention to improve the joints of the type mentioned above by providing suitable auxiliary means for the stabilization of the rubber blocks.

A further object of this invention is that of making possible the sale of the resilient annuli alone as spare pieces, already in precompressed condition, in order to facilitate their application or change.

A further object of the invention resides in providing the said auxiliary stabilization means combined with other means capable of ensuring stability conditions even in the annulus on sale as a precompressed spare piece.

A further object of the invention, combined with the preceding objects, is that of providing an advantageous structure of the said stabilization means and of the respective spiders of the joint.

According to a more general feature of this invention, there is provided a resilient annulus comprising: a polygonal series of rubber blocks with rectilinear axes, wherein the average length of each block is at least equal to the radial thickness of the latter, a rigid ferrule connecting each pair of adjacent blocks, said ferrule having formed therein an axially extending bolt hole, and a rigid tooth protruding in axial direction from each ferrule in an excentric position with respect of said hole, the teeth on the subsequent ferrules being turned in opposite axial directions. This invention further provides a resilient joint for shafts comprising in combination: a pair of spiders having their respective radial arms staggered therebetween through their half angular pitch a bolt on each of the said arms, said bolt being directed axially towards the opposite spider, a cavity in each of the arms formed in a position excentrical with respect of the axis of the respective bolt; and a resilient annulus for transmission of torque between the two spiders, said annulus including a polygonal series of rubber blocks with rectilinear axes, wherein the average length of each block is at least equal to the radial thickness of the latter, a rigid ferrule connecting each pair of adjacent blocks, said ferrule having formed therein an axial bolt hole in which a bolt on the respective arm is tightened, said ferrules being alternately associated with the respective arms of the spiders, and a rigid tooth protruding axially from each ferrule, said tooth being engaged in the cavity on the respective arm thereby to lock the ferrule against angular displacement on the respective bolt.

Further again, this invention provides a combination of the resilient annulus as defined above, with a circumferential precompression band and with at least a temporary retention plate superposed on a face of the annulus, sadi plate comprising a series of cavities engaged on the respective teeth protruding from the said face of the annulus thereby to hinder angular displacement of the ferrules around their axes.

Further features of the invention, as well as all resulting advantages, will be evident from the following description, with reference to the annexed drawing, wherein:

Figure 3 is a schematic view, similar to that of Fig. 1, showing the effects of instability;

Figure 4 is a perspective view of an annulus according to Fig. 1, packed as a spare piece, and Figure 5 is a perspective view of one of the two temporary retention plates employed in the structure shown in Fig. 4.

Figure 1:
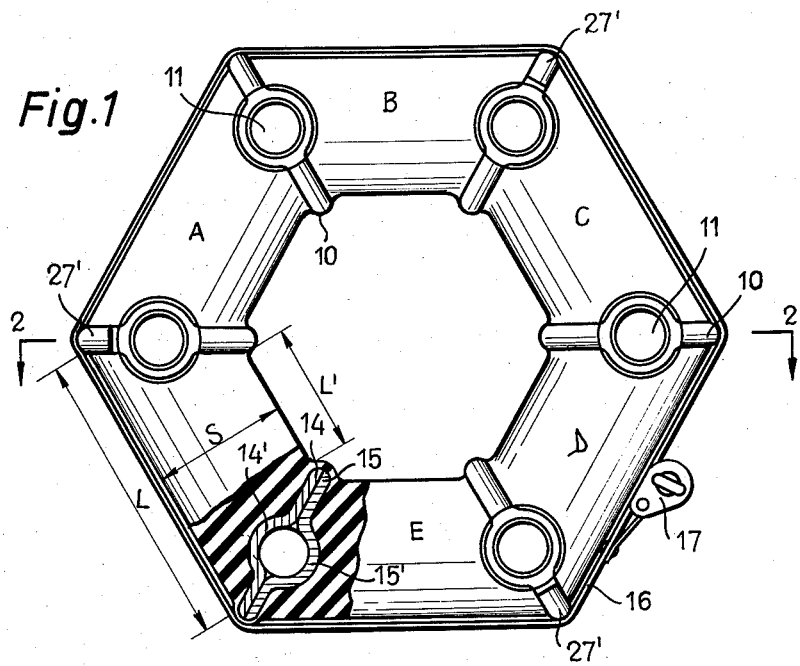
Figure 1 is an axial part-broken view of a resilient hexagonal annulus embodying the features of this invention.

In all figures, the equal or equivalent parts are indicated by similar references. Thus, references A, B, C, D, E and F stay to indicate six rubber blocks of circular cross-sectional shape forming a hexagonal resilient annulus. Between each pair of adjacent blocks is interposed a rigid ferrule 10 having a substantially cylindrical bolt hole 11 extending in the axial direction of the annulus. Exception being made for the region of said hole 11, the ferrules 10 are substantially flat and arranged in radial planes in a star-like formation around the axis of the annulus. The base surfaces of the single blocks converge therefore substantially on the axis of the ring, whereby the length L of the outer generatrix of each block is greater than that L' of the inner generatrix. Therefore the average length of each block is given by the relation $$\frac{L+L'}{2}$$

whose value, following an advantageous feature of the invention, is greater than the radial thickness S of the block. In the embodiment shown, S coincides with the diameter value of the block; nevertheless it is possible to employ blocks having a cross-sectional shape differing from the circular one, f.i. elliptic or square. Blocks wherein the average length is substantially lower than the radial thickness S are considered out of the objects and scope of this invention, both because resilient annuli formed by such blocks result of very reduced flexibility and therefore of no practical importance, or because the behaviour under load of such blocks substantially differs from the conditions contemplated by the present invention; indeed the blocks A . . . F employed herein are comparable each to a column loaded on opposite base surfaces, which is very different from a rubber "stopper," low and stumpy.

The bolt holes 11 in the ferrules 10 lie upon a common circumference concentrical with the axis of the annulus. Each ferrule 10 is formed by two metal plates 14, 15, central zones of which are cylindrically curved so as to form two shells 14', 15', defining between them the said bolt hole 11. The remaining zones of the plates 14, 15, are plane and spot-welded together, whereby the plates constitute a unitary member including a central cylindrical bushing and a pair of diametrically opposite flat wings radially extending from the latter. During the manufacture, six such ferrules 10 are inserted in a suitable mould, whereafter rubber mix is injected into the mould and vulcanized, whereby resilient annulus shown is obtained wherein the ferrules 10 are bound by vulcanization with the respective blocks A . . . F. Generally the mould is designed in a manner whereby the injected rubber mix will also cover the edges of the ferrules 10, as shown in Fig. 1, in order to provide a protective coating against rust and other deleterious agents.

The annulus shown in Figure 1 is sold in an already precompressed condition. For this purpose the ring is surrounded by a tie band 16, including a steel strip provided of a tightening device 17. Such tie bands are already well known, f.i. in the connections of flexible hoses to rigid fittings, whereby it looks superfluous a more detailed description of such bands.

Now, on account of a substantial ratio between the average length and the radial thickness S of each rubber block, there is the greatest probability that the annulus will assume a deformed configuration, qualitatively illustrated in Figure 3. In other words, even assuming the original configuration of the compressed annulus to be a fully regular one, similar to that shown in Figure 1, a shock of momentous deformation on transport or stockage could be sufficient to destroy such an unstable equilibrium and to deform the configuration of the annulus. It is understood that this effect will be of a reduced entity when the abovementioned ratio is lower than one (1) and when the degree of precompression is relatively low, and that, on the contrary, the said effect is the more remarkable the higher is the said ratio and the higher is the degree of the precompression. Of course mounting of the annulus so deformed will be difficult and moreover, when the storage period of the annulus as a spare piece is relatively long, the deformation can become at least partially a permanent one, so that the annulus cannot be used further.

Figure 2:
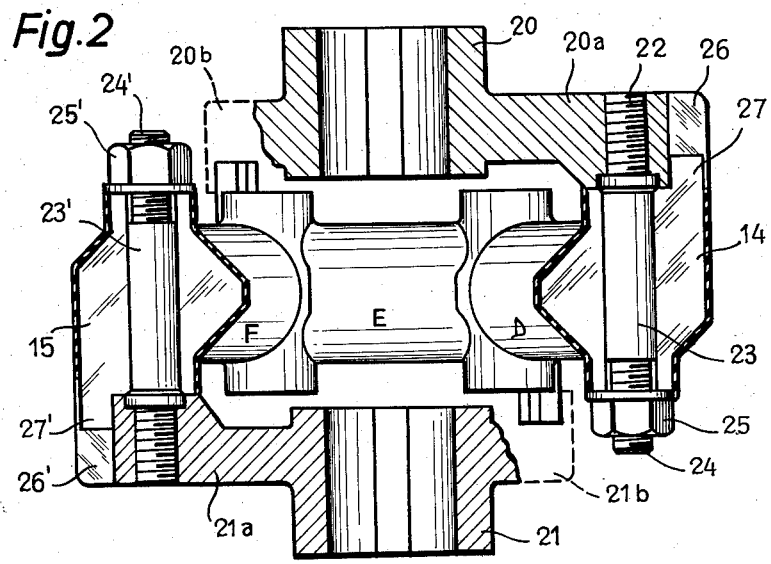
Figure 2 is a sectional view on a radial plane of a joint including a resilient annulus shown in Fig. 1.

Referring now to Figure 2, there are two spiders 20, 21, each having three radial arms, of which are visible in the drawing the arms 20a and 20b of the spider 20 and 21a and 21b of the spider 21. Both spiders are coaxial and displaced angularly with respect of each other through an angle of 60°, i.e. through a half angular pitch of the respective arms.

Reference 23 indicates a cylindrical steel bolt, having threaded ends 22 and 24. The end 22 is tightly screwed in a corresponding threaded hole in the arm 20a of the spider 20, the bolt 23 being parallel to the general axis of the joint and extending from the spider 20 towards the opposite spider 21. Two further similar bolts are provided on the two remaining arms of the spider 20, as well as further three similar bolts, such as 23' are provided on the three arms of the spider 21. The two series of bolts are slipped into alternate holes 11 in the resilient annulus shown in Figure 1, keeping the annulus in precompressed condition. The whole structure is consolidated by means of nuts 25, 25' screwed and tightened on the threaded ends 24, 24' of the respective bolts. In each arm of the two spiders 20, 21 a cavity 26 and respectively 26' is formed, such cavity consisting in the embodiment shown of a radial notch or slot, located radially external with respect to the threaded root such as 22 of the respective bolt. Such a notch or slot does thus not weaken the respective arm of the spider. On the other hand, each ferrule 10 of the resilient annulus is formed with a tooth 27 and respectively 27'. These teeth protrude alternately from the opposite two faces of the annulus in two axially opposite directions and engage as exactly as possible in the respective slots 26, 26'.

In Figure 1 there are visible only the teeth 27' destined to engage in the slots 26' on the spider 21. The teeth 27, 27' consist of axial extensions integral with the respective plates 14, 15 forming the ferrules 10, said extensions being adjacent to the radially external edges of the plates and having the excentricity equal to that of the slots 26, 26' in respect of the axes of the respective bolts 23, 23'. Owing to the radial arrangement of the slots (Fig. 2), the planes of all the ferrules 10 in the assembled joint will be exactly radial in respect of the axis of the joint, and said ferrules will be prevented from rotation on their respective bolts by the tight engagement of the teeth 27, 27' in the respective slots. It must be remarked that angular displacements of the ferrules 10 on the bolts 23, 23', can chiefly be due to two factors: loosening of one or more nuts such as 25 and 25' as may result from the wear caused by friction of the surfaces through which the bolt tightening pressure is transmitted, and transmission of torque to the ferrules 10 by the respective nuts in the moment of their tightening in the workshop; for example, tightening of a nut in the direction of the arrow 30 in Figure 3 could cause a deformation of the resilient annulus as shown in the said figure. The structure shown in Figures 1 and 2 avoids such drawbacks.

It is moreover useful to remark that the shape of the teeth 27, 27' and of the respective cavities 26, 26' has a practical importance. It has been found indeed that the cavities having a shape of radial slots and complementarily shaped teeth are very advantageous for that they localize exactly the position of the respective ferrules 10 without suffering from an appreciable wear involving undesirable clearances and plays.

The resilient annulus shown in Figure 5 corresponds substantially to that of Figures 1 and 2, except for the fact that in order to show more clearly the ferrules 10 formed by the metal plates 14, 15, the ferrules are shown uncovered, i.e. without the protective skin of rubber. In this Figure 5 is also visible the alternate arrangement of the teeth 27, 27' on the opposite faces of the annulus. The latter is further shown in precompressed condition assured by the steel tie band 16. In order to avoid the deformed condition shown in Figure 3, there are employed in Figure 4 two relatively rigid plates 31, 32, cooperating with the teeth 27' and 27 respectively to maintain the exact form of the resilient annulus during storage and transport as a spare piece. In the example shown, each plate 31, 32 is of an approximately triangular shape, in each apex of which a radial slot 33 is cut.

The three slots in the plate 31 tightly engage the respective teeth 27' on the opposite flat faces of the latter. A similar statement applies also to the plate 32. Each tooth 27, 27' results therefore restrained in the respective slot 33, whereby the ferrules 10 are locked against any angular displacement that might result in the deforming effect shown in Figure 3. For a greater safety, an axial finger 34 (Fig. 5) can be struck up from the plate at a location radially interior with respect of the respective slot 33, the finger being engaged in the bolt hole 11 in the ferrule 10 associated with the slot. In this way each ferrule 10 results doubly locked. The package can be completed by a diametrical bandage of an adhesive strip, maintaining in position the plates 31, 32 until the use of the annulus. The plates 31, 32 can be of sheet metal or moulded in a synthetic thermosetting resin. In this last event the fingers 34 will be moulded preferably in the shape of cylindrical projections having a diameter designed so as to engage exactly in the respective holes 11.

It is to be understood that the plates 31, 32 can be shaped in a manner different from that shown. It is nevertheless interesting to note in this respect the importance of the shape of the teeth 27, 27', already mentioned above: i.e. a "radially flat" shape, which in combination with the slots 33 is generally sufficient for avoiding undesired deformations of the resilient annulus when handled as spare piece. From this point of view, f.i. a cylindrical tooth lodged in a cylindrical cavity would be completely ineffective.

Of course, if desired, teeth similar to those 27, 27' could be formed (alternatively or additionally) on the radially interior edge sections of the plates 14, 15, especially when the annulus has to be strongly precompressed; in this event, of course, the arms of the spiders should be formed with corresponding cavities.

What we claim is:

1. A resilient annulus for transmission joints including a polygonal series of rubber blocks having rectilinear axes, wherein the average length of each block is at least equal to the radial thickness of the latter, a rigid ferrule connecting each pair of adjacent blocks, said ferrule having formed therein an axially directed bolt hole, and a rigid tooth protruding in axial direction from each ferrule in an excentric position in respect to said hole, the teeth on the subsequent ferrules being directed in axially opposite directions.

2. Resilient annulus as claimed in claim 1, wherein the said ferrules consist each of a pair of superposed metallic plates positioned on a radial plane of the annulus.

3. Resilient joint for transmission of torque, including in combination a pair of spiders wherein the radial arms on a spider are staggered angularly by a half pitch with respect of the arms on the other spider, a bolt on each arm, said bolt being axially directed towards the opposite spider, a cavity on each arm in a position excentric with respect of the axis of the respective bolt; and a resilient annulus for the transmission of torque between the two spiders, said annulus comprising a polygonal series of rubber blocks having rectilinear axes, wherein the average length of each block is at least equal to the radial thickness of the latter, a rigid ferrule connecting each pair of adjacent blocks, said ferrule having an axial bolt hole formed therein engaged on the bolt of the respective arm, said ferrules being alternately associated with the respective arms of the two spiders, and a rigid tooth protruding axially from each ferrule, said tooth being lodged in the cavity on the respective arm thereby preventing angular displacements of the ferrule on the respective bolt.

4. Resilient joint as claimed in claim 3, wherein the said ferrules consist each of a pair of superposed metal plates positioned on a radial plane of the annulus and forming the said hole and tooth.

5. Resilient joint as claimed in claim 3, wherein the cavity and the tooth are located radially externally in respect of the axis of the bolt.

6. Resilient annulus as claimed in claim 1, in combination with a circumferential tie band and with a temporary retention plate applied against a face of the annulus, said plate including a series of cavities in which the respective teeth protruding from said face of the annulus are engaged.

7. In the combination as claimed in claim 6, a rigid finger protruding from a face of said plate and engaging in the bolt hole in the respective ferrule.

References Cited in the file of this patent

UNITED STATES PATENTS

| | | |
|---|---|---|
| 1,406,112 | Ungar | Feb. 7, 1922 |
| 1,658,441 | Hemeon | Feb. 7, 1928 |
| 2,708,352 | Boschi | May 17, 1955 |